United States Patent [19]
Armstrong

[11] Patent Number: 5,590,819
[45] Date of Patent: Jan. 7, 1997

[54] VEHICLE MOUNTABLE AUXILIARY WATER TANK

[76] Inventor: Robert C. Armstrong, 4774 Lee Ave., La Mesa, Calif. 91941

[21] Appl. No.: 422,796

[22] Filed: Apr. 17, 1995

[51] Int. Cl.$^6$ ...................................................... B60R 11/00
[52] U.S. Cl. ....................... 222/609; 141/95; 222/181.1; 222/481; 224/538; 224/401
[58] Field of Search ............................. 222/181.1, 608, 222/609, 478, 481; 141/94, 95; 224/405, 401, 493, 515, 538

[56] References Cited

U.S. PATENT DOCUMENTS

| | | | |
|---|---|---|---|
| 912,261 | 2/1909 | Perry | 222/608 |
| 1,158,394 | 10/1915 | Skelton | 224/538 |
| 1,411,378 | 4/1922 | Robinson | 224/538 X |
| 2,742,191 | 4/1956 | Corsaw | 222/181.1 X |
| 2,757,823 | 8/1956 | Blanchard et al. | 222/181.1 X |
| 3,198,397 | 8/1965 | Lo Bello | 222/610 |
| 3,227,410 | 1/1966 | McCuen | 224/401 X |
| 3,263,865 | 8/1966 | Kachnik | 222/608 X |
| 3,434,513 | 3/1969 | O'Bannon | 141/95 |

FOREIGN PATENT DOCUMENTS

| 4211688 | 1/1993 | Germany | 224/538 |
|---|---|---|---|

*Primary Examiner*—Kevin P. Shaver
*Attorney, Agent, or Firm*—John R. Duncan; Frank D. Gilliam

[57] ABSTRACT

A water tank assembly for mounting between a motor vehicle frame member and the lower portion of a body panel along a side of the vehicle. The assembly includes, typically, a plastic cylindrical tank and at least two straps having an adjustable length and J-bolts at the ends for securing the tank to the typically channel section frame member. Saddle members are provided to fill the space between the tank and frame member. Preferably, shallow strap-receiving grooves are provided around the tank to hold the straps in position. A valved fill/dispense tube is provided near the lower tank side through which the tank is filled and which dispenses water as needed. An overflow device, typically a sprinkler system "bubbler" is provided at the top of the tank. The tank fill/dispense tube is readily accessible just below the vehicle body side while the tank is out of sight behind the side panel.

17 Claims, 1 Drawing Sheet

VEHICLE MOUNTABLE AUXILIARY WATER TANK

BACKGROUND OF THE INVENTION

This invention relates in general to water tanks and, more specifically, to an auxiliary water tank for mounting between the frame and lower body of a motor vehicle.

A small auxiliary water tank has many uses on a motor vehicle such as an automobile, sports-utility vehicle or light truck. The water may be used as emergency drinking water for an off-road vehicle or other vehicle traveling in the desert or other sparsely inhabited area. At construction sites, having water available is useful for drinking, washing up, etc. Trips to the beach with small children benefit from a water source to rinse sand from feet, etc. before entering the vehicle.

In the past various coolers, jugs, jeep cans and the like have been used to transport water. These containers must be filled with water and placed in the vehicle where they occupy valuable interior space and are prone to tipping and spillage. Generally, the container must be removed from the vehicle and tipped to pour water therefrom, resulting in spilling and waste. Filling is inconvenient, since they must be carried to a water source, then returned to the vehicle.

Brackets of various types have been developed for mounting on the backs of trucks to carry conventional coolers filled with drinking water. These brackets and coolers occupy considerable space, require removal and reinstallation of the cooler whenever the cooler is refilled and are susceptible to theft unless secured by a padlocks or the like. In addition, they are not useful with automobiles, sports utility vehicles and the like.

All motor vehicles have fuel tanks built in to hold the engine fuel, typically gasoline or diesel fuel. In some cases, auxiliary fuel tanks may be added to increase the fuel capacity and driving range before refueling. These tanks are significantly different from water tanks used for wash water, drinking water, etc., in that they have permanent outlet tubes to deliver fuel to the engine and generally do not permit easy access for removing fuel into another vessel. Thus, these auxiliary fuel tanks are not adaptable to carrying water for drinking or washing.

Thus, there is a continuing need for improved water tanks adapted to quick and secure mounting on a variety of vehicles, including automobiles and sports utility vehicles, which are unobtrusively mounted out of the way and substantially not visible to passersby, which permit easy and convenient filling to full capacity, and which permit easy and convenient withdrawal of water when needed.

SUMMARY OF THE INVENTION

The above-noted problems, and others, are overcome by the vehicle-mountable water tank of this invention, which basically comprises a preferably generally cylindrical closed tank, having a diameter sized to fit between a frame rail and vehicle body panel at the side of a motor vehicle.

At least two saddles having a first side shaped to match the outside surface of the tank and an opposite second side conforming to the rail, generally flat, are preferably bonded to the tank. At least two flexible straps extend around the tank, preferably at the same location as the saddles. Fastening means, preferably threaded J-bolts fasten the ends of the straps to the vehicle frame member.

A fill/dispense tube is connected to the tank at a point that will be low when the tank is installed. A valve in the tube serves to open and close the tube. Also, a second fill port may be provided, higher on the tank with a larger opening closeable by a conventional threaded pipe cap. That fill port would be used when a fill hose other that one which has threads to match the fill/dispense port is used.

The end of the fill/dispense tube is preferably threaded with a conventional garden hose thread, so that the tank can be filled simply by connecting a hose to the tube, opening the valve and tuning on water flow through the hose until water begins to come out of the overflow tube.

An overflow device is provided on the tank at a location which will be uppermost when the tank is installed in a vehicle. A conventional "bubbler" of the sort used in sprinkler systems is highly effective. Typical such bubblers are available from the Toro Company under the Model 53155 designation. Alternatively, a simple tube, preferably screened against insect entrance or having a simple removable cap may be used.

For optimum security in the tank mounting, it is preferred that shallow, about 0.1 to 0.25 inch deep grooves be formed at the strap locations, sized to fit the straps. The grooves may be defined by a groove directly formed in the tank wall, or ridges may be added to the tank wall to define grooves therebetween.

For maximum protection in use, if desired a guard formed from metal, plastic or the like, may be arranged around the fill/dispense valve to limit the possibility that the valve could be damaged by contact with foreign objects. Further, where the tank is to contain drinking water, a hinged cover may be provided over the fill/dispense valve to protect it from dirt or other contaminants if desired. Where the water is only to be used for washing hands, rinsing beach sand from feet and the like, such a cover is generally not necessary.

BRIEF DESCRIPTION OF THE DRAWING

Details of the invention, and of preferred embodiments thereof, will be further understood upon reference to the drawing, wherein.

DETAILED DESCRIPTION OF PREFERRED EMBODIMENTS

Figure 1:
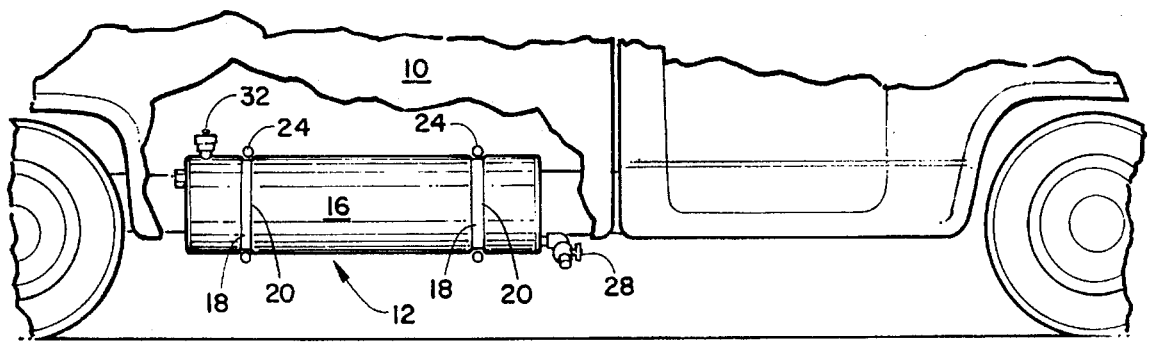
FIG. 1 is a side elevation view of the water tank assembly of this invention mounted on a vehicle, with portions of the vehicle body cut-away.
Figures 2, 3:
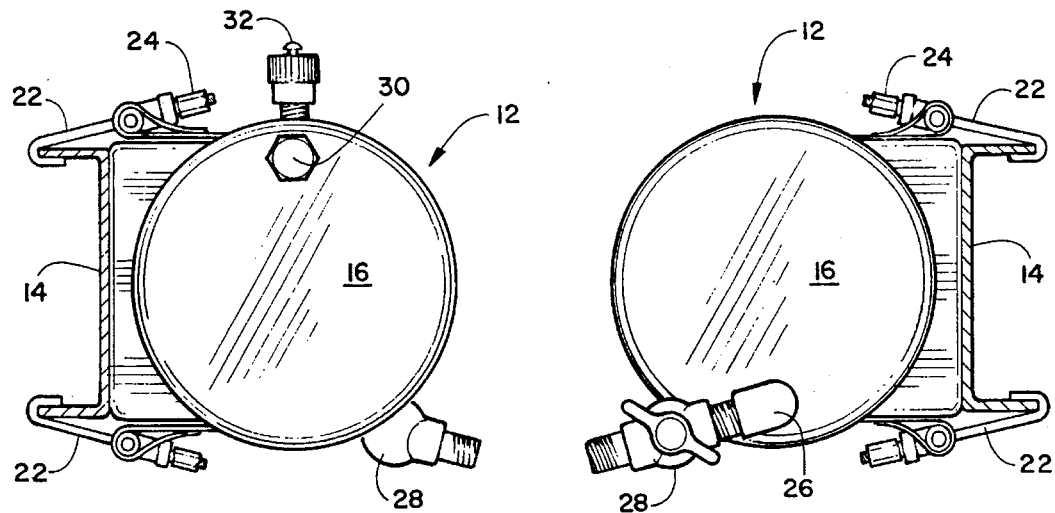
FIG. 2 is a left elevation view of the water tank assembly.
FIG. 3 is right elevation view of the water tank assembly.

Referring to FIGS. 1–3 there is seen a motor vehicle body panel 10, cut away to reveal the water tank assembly 12 mounted on a frame member 14, generally a channel beam as shown. Most vehicles having a separate body and frame can easily accommodate the tank assembly of this invention, with a few sizes fitting most vehicles. Typical vehicles include automobiles, vans, sports utility vehicles, pickup trucks and the like.

Figure 4:
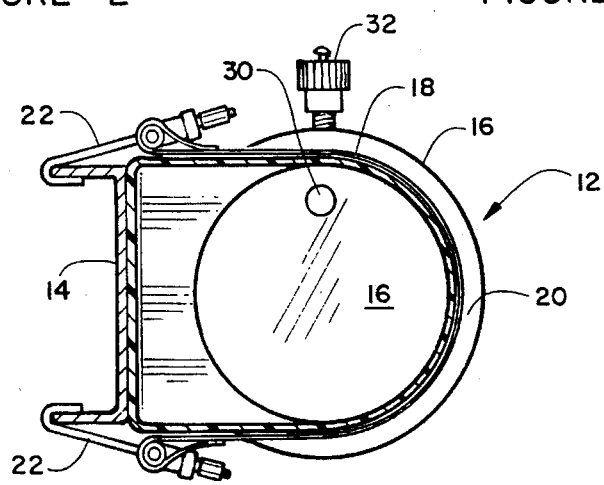
FIG. 4 is a transverse section view, taken adjacent to one retaining strap.

A water tank 16 is held to frame member 14 by a plurality of straps 18. While other shapes may be used, preferably tank 16 has a generally cylindrical shape for easy of mounting with straps 18 and simplicity of manufacture. While generally two straps 18 are sufficient, often three or more will be preferred where the tank is long or heavy and to provide redundancy in the event one strap should fail. For maximum security and avoidance of longitudinal slipping of tank 16 in straps 18, a groove 20 is provided at least partially around tank 16 having a width equal to or somewhat grater than the strap width. Grooves 20 may be cut or otherwise formed in the wall of tank 16, or may be formed by raised ridges bonded to or otherwise formed on the surface of the tank to define grooves therebetween. A groove depth (or ridge height of 0.1 to 0.25 inch is preferred. The depth of groove 20 is exaggerated in FIG. 4, for clarity.

Water tank 16 is formed from any suitable material. Typical materials include structural plastics, metals such as aluminum, fiber reinforced plastics and combinations thereof. Structural plastics such as polyvinyl chloride, acrylonitrile-butadiene-styrene, acrylics, are preferred for economy, ease of manufacture and structural strength. Straps 18 can be formed from any suitable material, such as metals, fiber reinforced plastics and the like. For best results, including strength, cost and corrosion resistance, stainless steel straps are preferred.

The ends of straps 18 have loops welded or riveted in place, surrounding a conventional sturdy tube having a transverse hole through which the threaded ends of conventional J-bolts 22 extend. A nut 25 is tightened on a J-bolt to tighten the strap. The hooked ends of J-bolts 22 are placed over the flange of channel shaped frame members 14. In the case of box section frame members, holes could be provided to receive the J-bolt ends.

Saddles 24 are provided between tank 16 and frame members 14. Each saddle 24 has one surface conforming to the surface of tank 16, in this case circular, and the other side conforming to frame members 14, in the embodiment shown, flat. Typically the saddles are formed from the same plastic material as that from which tank 16 is made and is bonded thereto, preferably by a suitable adhesive. Also, the saddles 24 could be formed with tank 12 by rotational molding, so that saddles 24 would be hollow, communicating with the interior of tank 12. For best results, saddles 24 align with the locations of straps 18.

Nuts 25 (best seen in FIG. 3) are tightened to shorten the strap and bolt assembly, pressing saddles 24 firmly against frame members 14. The assembly can be easily removed and installed on a different vehicle without any damages or apparent changes in the first vehicle.

A tube 26 having a valve 28 is secured to an opening in tank 16, typically by threaded connection or an adhesive. Tube 26 can be located at any convenient location, which may vary with the particular vehicle with which the tank is to be used. Generally, location tube 26 at the aft end of the assembly provides the maximum protection from road hazards and is preferred. The outer end of tube 26 preferably is threaded in a conventional garden hose thread to permit filling with such a hose. A second larger fill port 30 may be provided on the tank at a location higher than fill tube 26.

An overflow bubbler 32 is provided along the top of tank 16 to allow ingress of air when water is dispensed through tube 26 and valve 28 and air egress when the tank is being filled. Tube 32 further indicates when tank 16 is fully filled by overflowing. If desired, an overflow tube having a generally U-shape, extending up from the top of tank 16, then curving downwardly could be used.

While certain specific relationships, materials and other parameters have been detailed in the above description of preferred embodiments, those can be varied, where suitable, with similar results. Other applications, variations and ramifications of the present invention will occur to those skilled in the art upon reading the present Gisclosure. Those are intended to be included within the scope of this invention as defined in the appended claims.

I claim:

1. A vehicle mountable water tank assembly which comprises:

an elongated closed tank having a width sized to fit between a motor vehicle frame member and a body panel;

at least two saddle members having a first side conforming to said tank and a second, opposite, side shaped to conform to said frame member;

at least two straps for wrapping around said width of said tank;

fastening means for securing ends of said straps to said frame member including means for reducing length of said strap and fastening means to bring said at least one saddle into pressure contact between said tank and said frame member;

a fill/dispense tube, having first and second ends, connected to said tank for admitting water into said tank and for dispensing water from said tank;

a valve in said fill/dispense tube between said first and second ends to open and close said tube; and an overflow means connected to said tank on a side opposite said fill/dispense tube;

whereby said tank may be secured to said frame member with said fill/dispense tube lowermost and said overflow means uppermost.

2. The water tank assembly according to claim 1 further including at least two shallow spaced grooves around the width of said tank each groove sized to receive and constrain one of said straps.

3. The water tank assembly according to claim 1 wherein said tank is an elongated cylinder having a tubular wall and two closed ends.

4. The water tank assembly according to claim 3 wherein said fill/dispense valve extends from a first end of said cylinder adjacent to said tubular wall.

5. The water tank assembly according to claim 3 wherein said overflow means extends from said tubular wall adjacent to a second end of said cylinder.

6. The water tank assembly according to claim 5 wherein said overflow tube is a bubbler tube.

7. The water tank assembly according to claim 1 wherein said fastening means comprises a J-bolt having an end sized to hook over a flange of said frame member with a threaded opposite end extending through a cross piece secured to a strap end and threaded into a nut, whereby turning said nut in one direction will tighten said strap and turning said nut in an opposite direction will loosen said strap.

8. The water tank assembly according to claim 1 further including standard hose threads on said second end of said fill/dispense tube whereby a hose may be connected to said fill/dispense tube to fill said tank.

9. The water tank assembly according to claim 1 wherein said tank is formed from a structural plastic material and said at least two saddle members are adhesively bonded to said tank.

10. The water tank assembly according to claim 1 further including a further fill tube connected to said tank having a diameter sufficient to permit a garden hose to extend therethrough.

11. A vehicle mountable water tank assembly which comprises:

an elongated cylindrical tank having a width sized to fit between a motor vehicle frame member and a body panel;

at least two saddle members having a first side conforming to said tank and a second, opposite, side shaped to conform to said frame member;

at least two straps for wrapping around said width of said tank in alignment with said saddle members;

a shallow at least partially circumferential groove in said tank, in alignment with each of said saddle members, for receiving a strap;

fastening means for securing ends of said straps to said frame member including means for reducing length of said strap and fastening means to bring said at least one saddle into pressure contact between said tank and said frame member;

a fill/dispense tube, having first and second ends, connected to said tank for admitting water into said tank and for dispensing water from said tank;

a valve in said fill/dispense tube between said first and second ends to open and close said tube; and an overflow means connected to said tank on a side opposite said fill/dispense tube;

whereby said tank may be secured to said frame member with said fill/dispense tube lowermost and said overflow means uppermost.

12. The water tank assembly according to claim 11 wherein said fill/dispense valve extends from a first end of said cylinder adjacent to said tubular wall.

13. The water tank assembly according to claim 11 wherein said overflow means extends from said tubular wall adjacent to a second end of said cylinder.

14. The water tank assembly according to claim 13 wherein said overflow is a sprinkler bubbler.

15. The water tank assembly according to claim 11 wherein said fastening means comprises a J-bolt having an end sized to hook over a flange of said frame member with a threaded opposite end extending through a crosspiece secured to a strap end and threaded into a nut, whereby turning said nut in one direction will tighten said strap and turning said nut in an opposite direction will loosen said strap.

16. The water tank assembly according to claim 11 further including standard hose threads on said second end of said fill/dispense tube whereby a hose may be connected to said fill/dispense tube to fill said tank.

17. The water tank assembly according to claim 11 further including a second fill connection on said tank sized to allow a garden hose to extend therethrough.

* * * * *